Sept. 13, 1966    B. G. BJORNSEN ETAL    3,272,215
FLUID CONTROL APPARATUS

Filed Nov. 1, 1963    2 Sheets-Sheet 1

INVENTORS.
BJORN G. BJORNSEN
THOMAS J. LECHNER, JR.
BY
Andrus & Starke
ATTORNEYS United States Patent Office 3,272,215
Patented Sept. 13, 1966

3,272,215
FLUID CONTROL APPARATUS
Bjorn G. Bjornsen, Milwaukee, and Thomas J. Lechner, Jr., Menomonee Falls, Wis., assignors to Johnson Service Company, Milwaukee, Wis., a corporation of Wisconsin
Filed Nov. 1, 1963, Ser. No. 320,680
20 Claims. (Cl. 137—81.5)

This invention relates to a fluid control apparatus and particularly to a pure fluid means for controlling pressure and flow.

Fluid control and operating systems are widely employed in various industrial and other control systems such as machine tool, steam engines, internal-combustion rocket and airplane devices and in many other applications. Generally, pneumatic or hydraulic controls have employed cooperating mechanical devices such as linkages, valves, diaphragms and vanes to provide a control of the fluid stream.

Recent prior art developments have been directed toward pure fluid devices employing generally perpendicularly interacting and deflecting fluid streams one of which constitutes a supply-output signal stream which exists between a supply orifice and one or more collector orifices, the other of which constitutes a control signal stream which acts on the side of the supply stream to determine the alignment of the main stream with the collector orifice. Such devices operate on the principle of deflecting the supply-output stream at the point of intersection with the control stream for varying the collection of the main stream. The devices are generally differentiated from the conventional pneumatic and/or hydraulic amplifiers by denoting them as pure fluid amplifiers, employing only fluid flows or streams for control similar to an electronic amplifier using only electric current for control.

The prior art in connection with pure fluid devices has employed either of two alternate control or basic principles of varying the deflection and collection of the main stream; a direct stream interaction principle or a boundary layer principle, both of which may be broadly grouped together as stream deflection type fluid amplifiers or controls.

In the direct stream interaction control, a main power stream or jet is directed between an emitter orifice and a collector orifice. A control stream or jet is directed against the side thereof intermediate the two orifices to deflect the power jet with respect to the collector orifice. The high strength supply jet or stream can be directly controlled with a control stream of lower strength and consequently the device constitutes a fluid amplifier.

In the boundary layer type control of prior art fluid devices, the high energy jet is fed through a closed chamber between an emitter orifice and a pair of collector orifices. In this type, however, a predetermined wall configuration is provided to control the pressure distribution in the jet boundary layer region such that the power jet locks onto one or the other of the walls of the confining passages. Transfer from one mode of flow to another is established by a control jet or stream flowing along the wall or traversing to the stream causing the stream to be released and deflected to lock onto the other wall.

Prior art devices generally have a limited signal gain and the input signal impedance is generally relatively low. Further, prior art devices have most generally been of the closed variety wherein stream interaction and output changes are transmitted to the input signal, disturbing the characteristics of the latter.

The present invention is particularly directed to a completely new and novel fluid control device having an ability of providing an extremely high signal gain. The present invention can employ a plurality of fluid input and output signals either in the form of flow or pressure or a combination thereof and the relationship between such signals can be made to vary directly or indirectly in proportion to each other. The ratio of the signal can be made adjustable over a very large range of values.

The present invention is based on a completely different concept from all of the prior pure fluid control devices. The present invention employs a pair of impacting power streams having opposed velocity or momentum components and formed of a suitable gaseous or liquid fluid, solid and fluid mixture or a combination thereof. The two impacting streams establish a resulting flow or pressure output signal which is extremely sensitive to changes in the relative strength of the power streams and thus produces a high gain characteristic.

In one flow mode, the streams are relatively unconfined or free in the area of impacting and generally radially directed flow can be obtained and a suitable flow collecting means provided with respect to the output stream. If one stream is stronger than the other, the output flow is generally angularly directed in the direction of the stronger stream, for either a three or two dimensional flow condition. The impacting or equilibruim region of the two streams at which the output stream is created is dependent on the relative inertia forces corresponding to momentum flux or flow of the two impacting or impinging streams. In the static condition, the two streams establish a balanced system having a definite inertia force or momentum flux balance position between their origins. A very slight unbalance in the strength of either one or both of the signals substantially varies the position and/or shape of the output with respect to the output collecting means. As a result, the output signal is extremely sensitive to changes in the relative strength of the impacting streams such that the present invention provides a high gain pure fluid control device.

The force and momentum flux balance concept depends on employing streams which include opposed force or momentum flux components and in the above mode for optimum operation are preferably parallel and opposed with a generally common flow coincident axis.

In a further and most important mode of operation, the output is a pressure signal with such flow in the system as necessary to maintain the pressure signal. In this mode, the interaction of the two impacting streams is established at a control or output orifice having an output chamber to one side thereof. The streams establish opposing inertia forces or momentum fluxes creating a force balance in or adjacent the output side of the orifice. The excess force or momentum flux is collected on the output side of the control orifice as a high pressure signal. The orifice may be any suitable configuration and preferably provides a complete encirclement of the streams at the output edge of the control orifice to prevent loss or leakage of the output pressure. The device then has a high impedance to the reference region which permits the output pressure to increase and to be maintained at a high level. The available output flow, being the result of two impacting power streams, is large illustrating the low output impedance of the device.

Further, applicants have found that an impacting stream unit can be operated in either of two modes; one proportional and the other a switch. The pressure in the control region provides positive or negative feedback with respect to the output pressure. When the system arrangement is such that the output pressure establishes a negative feedback, the output power stream increases in strength with an increase in output control pressures. In the alternative mode, a positive feedback occurs and the output of the fluid system becomes bistable; that is, acts as a switch. The two modes of operation are more fully described in connection with the description of the several embodiments shown in the drawings hereinafter.

Within the scope of the present invention as thus defined, the relative strength of the two impinging streams can be controlled directly or indirectly in any desired manner. The strength of one or both streams may be directly controlled at the pressure source employed in forming the stream, controlled by deflection of the streams by the deflection systems heretofore employed in fluid devices or by any other suitable means.

For example, a controlled impacting stream may be emitted from an orifice establishing the stream substantially parallel to the opposed stream. To the input side of the orifice, a deflection control system may be provided to adjustably deflect the stream into the orifice and thereby vary the strength of the stream.

Although any stream strength control means can be employed, applicants have found a particularly unique and novel means for controlling stream strength by a controlled impedance fluid unit which may have a high impedance input characteristic and when combined with an impacting stream output device provides a uniquely useful, novel and efficient fluid device. The control input as such is the subject matter of a separate application entitled Input Fluid Control Apparatus filed on November 1, 1963, with Serial No. 320,681 and assigned to a common assignee.

Briefly, stream strength control employs the boundary layer between the controlled stream and the surrounding fluid or ambient within a control orifice. By selective addition or removal of fluid therein, the losses and thereby the strength of the controlled stream can be varied.

Applicants have found the input control system provides the very important and unique control feature of a high impedance wherein there is no change in the signal flow for changes in input signal pressures results from selected relationship of orifices and stream strengths. In this mode, as the pressure is increased, the strength of the main stream is changed however.

The pressure differential type control establishes a true pressure control system and closely approximates electronic amplifier and related devices having high input impedances with the corresponding advantages. Although a signal flow may exist in this mode of operation, the flow is sufficiently small to allow effective termination in its own input impedance and consequently one signal can drive many similar stages in parallel. This pressure signal input in combination with the impacting streams provides a pure fluid device having high impedance on both the input side, and low impedance on the output side such that the device can be terminated in its own input impedance without substantial loading. In summary, the present invention provides a completely new and novel pure fluid device having many advantages, particularly from the standpoint of the gain and the impedance characteristics of the fluid signals.

The many advantages, objects and modes of operation of the present invention are more fully developed in connection with the description of the accompanying drawings furnished herewith for illustrating the best modes presently contemplated for carrying out the invention.

Figure 1:
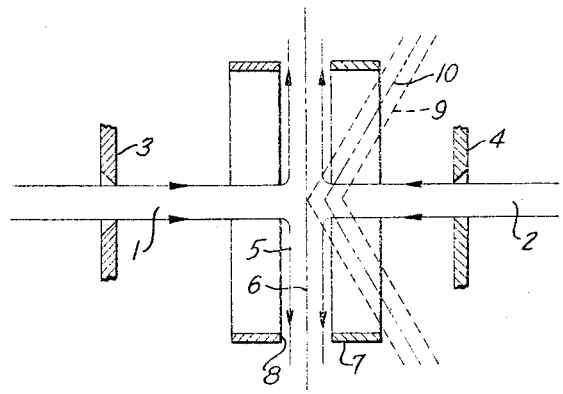
FIG. 1 is a diagrammatic view of a modulator disclosing the principles of the present invention.

Referring particularly to FIG. 1, a pair of opposed impinging jets or streams 1 and 2 is illustrated for three dimensional or axially symmetric open flow. Streams 1 and 2 respectively are formed by a pair of spaced similar emitting orifices 3 and 4, shown of the same cross sectional area. The streams 1 and 2 are also of the same strength. At the position or vertical plane of impact, a disc-shaped output stream 5 is established as shown in full line in FIG. 1. A sharp pressure gradient, shown by phantom line 6 exists in the plane bisecting the stream 5. The high pressure gradient essentially prevents flow across this plane and effectively divides the stream into a pair of immediately adjacent similar streams.

An annular collector 7 is shown having a central slit or opening 8 aligned with the high pressure gradient plane 6 to collect the flow and/or pressure. The vertical plane 6 constitutes a momentum flux or flow balance position between the two streams. A small change in the strength of either stream 1 or 2 creates a very substantial change or shift in the position of the balance plane or point position. Additionally, increasing the strength of one stream tends to divert the output stream 5 in the direction of the stronger stream to produce a cone-shaped output stream having a cone-shaped high pressure gradient. Thus, if stream 1 is increased slightly in strength, either by increasing the mass or pressure thereof, an output stream 9 having a bisecting pressure gradient shown in dashed outline in FIG. 1 may be provided. Similarly, increasing the relative strength of stream 2 would create a similar output stream projecting to the left in FIG. 1.

The position of the output stream 9 and the bisecting pressure gradient 10 with respect to the collector 7 and the collector opening 8 may therefore be changed by changing the relative strength of the two streams to vary the output flow and pressure. Of great importance, however, is the sensitivity of the stream system and particularly the balance plane to changes in the relative stream strength. This, a relatively small variation in the strength of either stream results in a substantial shifting of the balance plane and the position of the output stream with respect to opening 8. The present invention as diagrammatically shown in FIG. 1 thus produces a pure fluid device having a high gain.

Although the streams 1 and 2 are shown of the same diameter or size and essentially aligned in FIG. 1, different configurations can be employed within the scope of the present invention. The opposed streams of the present invention, however, have substantially the same basic strength and have opposed velocity vectors which interact to establish the zero velocity point or surface with the resulting discontinuance or sharp pressure gradient.

Figure 2:
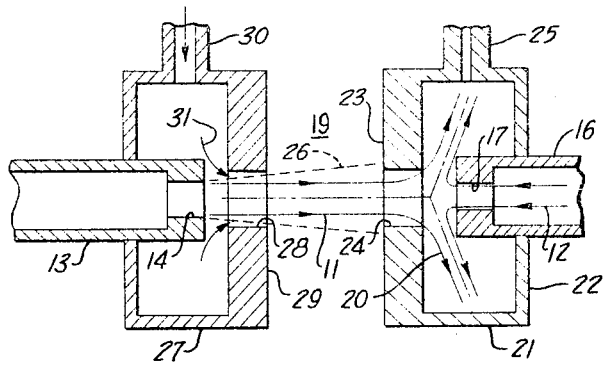
FIG. 2 is a diagrammatic illustration of a direct impact pure fluid device constructed in accordance with the present invention.

Referring particularly to FIG. 2, a pure fluid control unit is illustrated employing opposed streams to produce an output pressure signal. The unit of FIG. 2 includes a pair of aligned and opposed impinging or impacting power streams or jets 11 and 12. The jet 11 is emitted from a pressurized conduit 13 having a supply emitter opening or orifice 14. A second jet conduit 16 having an orifice 17 establishes the jet 12. In FIG. 2, emitter orifice 17 is shown smaller than orifice 14 and consequently the diameter of jet 12 is correspondingly less than jet 11. The orifices 14 and 17 are shown axially aligned and spaced in a predetermined manner to establish coincidence of the axis of the jets 11 and 12 with a predetermined free space 19 between the orifices 14 and 17 although as subsequently described, this arrangement can be substantially changed. The free space 19 is preferably maintained at an ambient pressure, assumed herein to be atmospheric, to prevent transmitting variation in the output to the input signal. In actual practice, other constant pressures might be employed.

A suitable signal collector housing or chamber 21 includes a back wall 22 having an opening through which the signal conduit 16 projects with the junction therebetween being substantially sealed against leakage. The front wall 23 of chamber 21 is located forwardly of the conduit 16 and includes a central collector orifice 24.

An output tap 25 is provided in the outer wall of the chamber 21 to transmit the output pressure signal in accordance with the collection of the output stream 20, which is developed with respect to the forces on the input side and the output side of the control or output orifice 24, as follows.

The incoming jet 11 includes an expanded boundary layer as shown by the dotted lines 26 and at the point of intersection defines a stream somewhat greater than the orifice 24. The collector orifice 24 is shown somewhat larger than the basic diameter of main stream 11 but less than its expanded diameter at the point of intersection. Orifice 24 is shown concentrically disposed although this is not essential. The size of collector orifice 24 may be the same and in some designs larger than the stream but must be positioned to allow positioning of the balance point to the input side or opening edge of the orifice.

The stream outside the input edge of orifice 24 strikes the adjacent front wall and is discharged in the ambient pressure area. The stream portion aligned with the orifice 24 is thus the effective stream which opposes the stream 12 from the opposite power nozzle or conduit 16. The orifice 24 acts to integrate the momentum flux or flow of the stream aligned therewith and establishes an average momentum flux or force, which is dependent on the radius of the orifice and the velocity of the stream, as well as the static pressure in the ambient pressure area.

The opposite stream 12 establishes an opposite momentum flux which is integrated to produce an average balancing momentum flux opposing the momentum flux of the opposed stream.

The relative strength of the two impinging jets 11 and 12 is such as to locate momentum flux or flow balance in the region of the output control orifice, and more particularly, when a low output impedance is desired, past the input side or edge of the output control orifice. This creates a true force or flux balance between the two streams within the region of the output control orifice 24 which is also extremely sensitive to changes in the strengths of streams 11 and 12.

The forces may balance either within the orifice 24 to the input side thereof or to the output side thereof. To either side of the output control orifice 24, the impacting streams produce a radial type output more or less similar to the operation described in FIG. 1.

When the momentum flux balance occurs within the control orifice 24, the theoretical behavior cannot be defined with preciseness due to the complexity of the phenomenon. Thus, in describing the balance of the two streams, it is not meant to imply that a perpendicular plane is necessarily established across which flow does not exist as generally set forth in the previous description of FIG. 1 but rather that it appears there is a net zero flow through the orifice 24. However, the pressure forces of the jets 11 and 12 are equal and opposite with only the inertia forces or momentum flows being opposed. The surplus flow of incoming jet 12 over and above that necessary to balance the momentum flux of the opposite stream is collected by the collector which is shown essentially dead-ended; that is, having a small transmitting opening for transmission of a high pressure fluid signal. The output pressure at tap 25 of the collector builds up until the momentum flux of the two streams within or at the orifice balance. This establishes the necessary steady state where the surplus flow delivers the necessary power to maintain the output pressure.

With the force balance established with the output orifice 24, the output chamber 21 is essentially completely closed to the reference region and the impedance to that region is high, permitting the building and maintaining of the high output pressure. This produces an output characteristic which closely simulates electronic devices and permits direct cascading of the units. Although flow is present, it is such only as to give the necessary power to sustain the pressure, as above noted.

As previously noted, the flow and pressure patterns within the output control orifice appear to be extremely complex and the above explanation appears to be useful in practical application of the present invention.

In accordance with general theoretical mechanical analysis, a force balance system is extremely sensitive to any force change in the system. As a result, with the system in equilibrium, a very slight unbalance of the stream strength is required to effect a relative substantial change in the position of the equilibrium position. Therefore, a very small change in relative stream strength of streams or jets 11 and 12 provides a relative high change in the output signal at tap 25 and consequently the device provides a very high gain. The change can be effected by increasing or decreasing the relative strength of streams 11 and 12 with respect to each other.

In both of the embodiments of the invention illustrated in FIGS. 1 and 2, the impacting stream requires opposed components to provide a control within the present invention.

In connection with the embodiment of FIG. 1, if the streams are not essentially or predominately parallel, however, the interacting point or plane cannot vary substantially and provide optimum operation. Varying the relative strength of the streams 1 and 2, in addition to the moving of force-balance point, does, however, vary the cone angle of the output stream 9. This additional characteristic of the present device permits use of the impacting stream concept wherein the balance point does not vary. Thus, if two streams are established at some angle less than ninety degrees but more than zero degrees such that there are proportionately less parallel stream portions, the balance point remains more or less constant. However, the output cone-shaped potential gradient varies with changes in the relative strengths of the streams. Generally, the potential gradient control degrades as the angles between the two streams increase and it would appear that an effective control of this type would employ minimal angles of divergence.

In the embodiment of FIG. 2 wherein a pressure output signal is desired, the requirement is less critical in that the orifice 24 functions to integrate the momentum flow and the important feature is the orientation of the orifice and particularly the openings thereof relative to the intersection of the two streams. Thus, as previously noted, the stream is averaged or integrated and is dependent on both the radius or size of the orifice and the stream velocity. Therefore, for any given orifice, the desired force can be established by adjustment of the velocity of the streams 1 and 2. This feature of the invention is of considerable practical importance in providing a very ready and simple means of compensating for desirable manufacturing tolerances as well as variations with use.

The orifice 24 may therefore be of any desired configuration. For example, the output control orifice may be a curved passageway with the power streams directed into the opposite ends or openings thereto. One stream or both streams may be angularly related to the corresponding opening of the control orifice. Further, the orifice 24 need not be an accurate cylinder and in fact can have practically any internal configuration or profile. For example, the orifice may be frustoconical with relatively large and small openings at the opposite end. The orifice 24 acts to integrate the inertia force or momentum flux of the two streams and creates a force balance between the two streams with an output pressure created within the output collector with sufficient flow to maintain or provide the power for maintaining the pressure.

The embodiment of the invention shown in FIG. 2 incorporates the unique input signal control assembly which is generally the subject matter of applicants' previously referred to copending application.

An input signal chamber 27 encircles the supply conduit 13 and includes a control orifice 28 in the front wall 29. The front wall 29 is located to dispose the orifice 28 spaced forwardly of the emitter orifice 14 and concentric therewith. An input signal tap 30 is connected to a pressurized control fluid signal source, not shown, and is adapted to create a variable fluid control signal stream 31 to the input signal chamber 27 and the control orifice 28 concentrically about the stream 11. The stream 31 is introduced generally tangentially of the circumference of the power stream 11 and enters the boundary layer 26 of stream 11, shown diagrammatically by the dotted cone 26. The boundary layer constitutes the outer circumference of the impinging stream 11 and its surrounding fluid, in the illustrated embodiment of the invention considered to be atmospheric air, as previously noted.

When the fluid stream 31 is added to the stream boundary layer 26, the boundary energy in the boundary layer increases and the frictional forces decrease and effectively increase the strength of stream 11 before impact with the opposing stream 12. In this manner, the momentum flux balance within the control orifice region is controlled with the resulting amplified changes in the output pressure.

A low pressure signal stream 31 can control a high pressure stream 11 and provide high signal gain. The relatively low ambient pressure of space 19 eliminates variation in the illustrated embodiment of the invention. Where such characteristic is not required or desired, a completely closed configuration may, of course, be employed.

The input control unit also has the alternative mode of operation characterized by the high input impedance and thus functions as a pneumatic grid.

At a given input signal flow and pressure for any given geometric construction, further increases in pressure are not accompanied by any significant increase in flow and the device exhibits essentially an infinite input impedance. In this mode of operation, the main stream 11 is as large or larger than the input control orifice 28 establishing saturating flow in the control orifice either as a result of original design or because the input signal added to the boundary layer has expanded the stream to the size of the control orifice. As a result, the flow through the control orifice 28 is saturated. Increasing the pressure of the control signal does vary the signal flow but does not change the strength of the stream 11. In this mode, the impedance of the input is very high.

The operation of the input side of the device with a high impedance and the output side of the device operating in the pressure mode with a low output impedance is a particularly substantial step forward in the art of pure fluid devices in providing a near infinite fluid signal impedance and will permit completely new concepts in the theory and design of pure fluid devices.

The device of FIG. 2 can be employed as a gain amplifier or a switching device. Thus, generally, if the stream is held at a constant pressure and the pressure of the opposed stream is increased, the output pressure rises until at a predetermined stream pressure, the output pressure decreases substantially. The output then essentially is shifted or switched to the input side of the orifice 24. As the pressure is reduced from this switching pressure, the output pressure remains low until a second lower or return switching pressure is established, at which time the output pressure jumps to the output side of orifice 24. The switching action appears to be derived from the characteristic of the feedback pressure acting to provide postive feedback in one state and negative feedback in the other. When the positive feedback characteristic is established, the device produces an on-off or switching characteristic. When the negative feedback effect is created, the device produces a proportional output. This behavior of the device has been discovered in operation of an impacting stream unit by noting the modulation effect of the control or output pressure on the power stream. An increase in control pressure increases the strength of the main stream in one region and reduces the strength thereof in the other regions.

Figure 3:
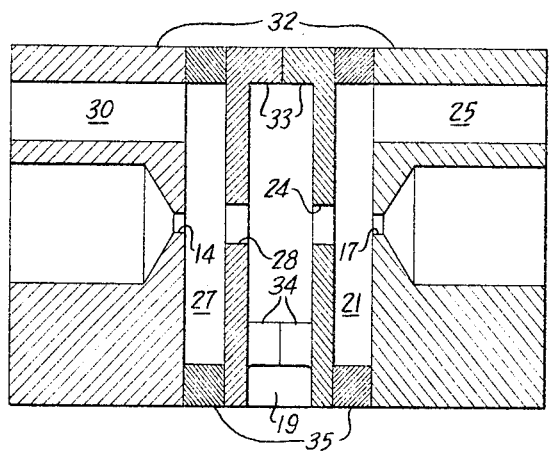
FIG. 3 is a sectional view similar to FIG. 2 of an impact unit which has been employed as an amplifier and as a switching device.

FIG. 3 illustrates a small integrated assembly which has been employed as both an amplifier and a switching device. The several orifices are numbered in accordance with the numbering of FIG. 2 for purposes of simplicity of description. In FIG. 3, the apparatus is symmetrically formed about a vertical plane with the supply orifices 14 and 17 formed in similar body members 32. The control signal orifice 28 and the output orifice 24 are similarly formed in plate members 33 having opposed pairs of spacing projections 34 defining the gap 19. Similar ring spacers 35 of the appropriate thickness are disposed between the body members 32 and the plate members 33 to provide selected spacing of the corresponding orifices and define the input chamber 27 and the output chamber 21. A signal inlet passageway corresponding to taps 30 and 25 is provided in body members 32 extending parallel to the main supply pressure openings.

Figure 4:
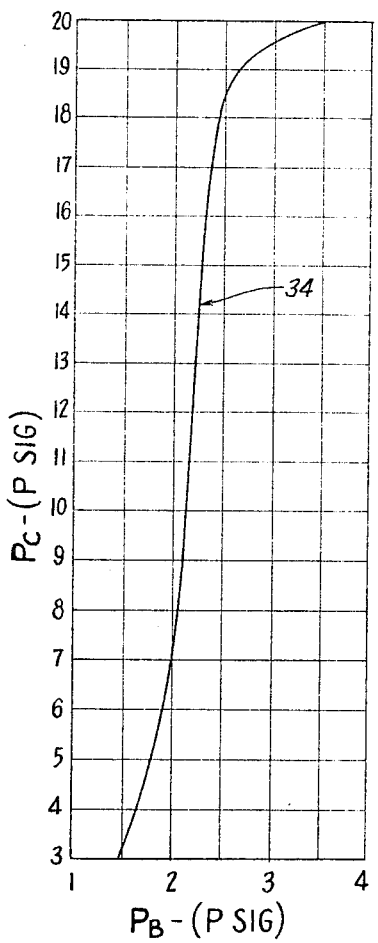
FIG. 4 illustrates the input-output curve of a unit such as shown in FIG. 2 operating as an amplifier.

FIG. 4 is a curve 34 of the input pressure signals in pounds per square inch gage versus the output pressure in similar units, for a device corresponding to FIG. 3 and having the following dimensions:

| | Inch |
|---|---|
| Main supply orifice (14) | 0.016 |
| Main supply orifice (17) | 0.016 |
| Signal orifice (28) | 0.020 |
| Output orifice (24) | 0.020 |
| Space between orifices (14) (28) | 0.005 |
| Space between orifices (24) (17) | 0.015 |
| Gap between orifices (24) (28) | 0.040 |

The pressure supply at orifice 14 was 25.0 p.s.i.g. and at orifice 17 was 20.5 p.s.i.g. The signal pressure as shown by the amplification curve was varied between 1.5 p.s.i.g. and 3.5 p.s.i.g. As a result of this variation, the output or collected pressure varied from 3 p.s.i.g. to 20 p.s.i.g. thereby clearly indicating the very high gain characteristic of this pure fluid amplifier of this invention. The gain was particularly high between input signal pressures of 2 and 2½ p.s.i.g. in the illustrated embodiment of the invention.

Figure 5:
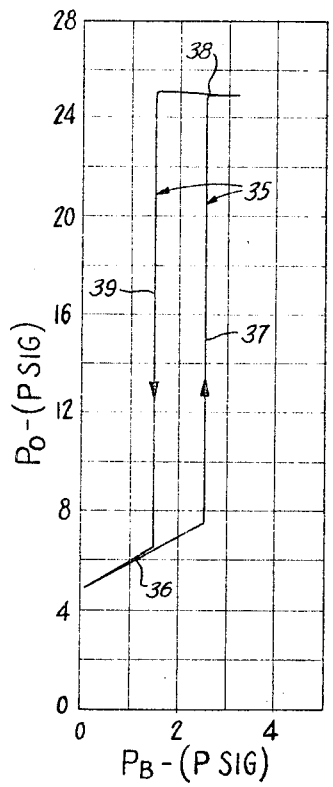
FIG. 5 is an input-output curve showing the switching action of a unit.

FIG. 5 is an input-output curve 35 as FIG. 4 but illustrating a switching action for a unit similar to that shown in FIG. 3. The unit had the following dimensions:

| | Inch |
|---|---|
| Main supply orifice (14) | 0.016 |
| Main supply orifice (17) | 0.016 |
| Signal orifice (28) | 0.0225 |
| Output orifice (24) | 0.020 |
| Space between orifices (14) (28) | 0.010 |
| Space between orifices (24) (17) | 0.005 |
| Gap between orifices (24) (28) | 0.020 |

The pressure supply at orifice 14 was 26.0 p.s.i.g. and at orifice 17 was 25.0 p.s.i.g. The signal pressure was varied from near zero to 3.2 p.s.i.g. and back to near zero The resulting curve includes an initial linear rising portion 36 to an input pressure of just over 2.25 p.s.i.g. with the output pressure increasing from 4.8 p.s.i.g. to about 7.6 p.s.i.g., at which point the output pressure rises abruptly to 24.9 p.s.i.g. as at 37 and remains at that pressure for further increases in signal pressure as at 38 Thus, the output has moved to the output side of orifice 24 and produces a maximum output signal.

As the input signal pressure is decreased, the output pressure follows the increasing pressure curve 38 to the on-switching pressure of 2.25 p.s.i.g. but does not drop at that point. Rather, the output pressure remains essentially constant until the signal pressure is reduced to 1.4 p.s.i.g., at which point the output pressure drops abruptly along the curve portion 39 to 6.4 p.s.i.g. on the linearly rising initial portion 36 and follows the same portion with further decreases in signal pressure. The device not only has the infinite gain characteristic of a switching device but also the typical hysteresis curve associated with switching of bistable devices.

As previously noted, the present invention was described as having a positive feedback effect to produce the switching as shown in FIG. 5. The positive feedback effect is clearly present in the system as shown in FIG. 5 and apparently results from the interaction of the stream and the output or control orifice 24. As the strength of the stream from orifice 14 in increased, as a result of the input signal in chamber 21, the balance or impacting stream position moves through the orifice 24 as noted above. The orifice 24 provides an interaction with the stream balance position tending to substantially oppose the complete movement through the orifice and requires a force over and above that which would normally be required to move the impact position by this amount. As a result, the force must be continuously increased in moving the impact position through the orifice 24. However, once the impact stream position reaches the inner end of the orifice adjacent chamber 25, the opposing action of the orifice 24 suddenly disappears or is removed and consequently the total pressure appears in chamber 21 and the pressure snaps upwardly to the high value as shown in FIG. 5. Conversely, in reducing the pressure, the impacting position does not freely move to the opposite side of the orifice 24 and a certain pressure drop is required to move the impacting streams back through the orifice 24, as shown in FIG. 5.

Figure 7:
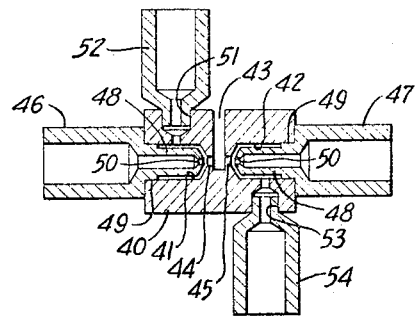
FIG. 7 is an enlarged vertical section through the control shown in FIG. 6.
Figure 6:
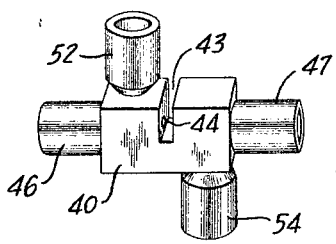
FIG. 6 is a pictorial illustration of a symmetrical signal unit constructed in accordance with the present invention.

In FIGS. 6 and 7, a small integrated unit is shown including a solid metal body 40 symmetrically formed about a vertical center line with opposed cylindrical openings 41 and 42 on opposite sides thereof defining the signal chamber and the collector chamber of FIGS. 2 and 4. The reference space 19 is defined by a vertical slot 43 extending downwardly from the top surface of body 40 between the openings 41 and 42. Aligned orifices 44 and 45 corresponding and constituting the signal orifice and collector orifice of FIG. 2 connect the corresponding openings 41 and 42 with the reference chamber slot 43. Similar jet supply pipes 46 and 47 are similarly secured within the openings 41 and 42 and are adapted to supply a jet of air or other suitable fluid, not shown. The supply pipes 46 and 47 each include a reduced inner end 48 integrally secured to the main body portion by a stepped construction, as at 49. The stepped portion fits tightly within the outer end of the corresponding opening to provide a fluid tight joint. The inner end 48 projects through the opening and terminates in an orifice 50 spaced from and aligned with the signal orifice 45. The adjacent innermost ends of opening 41 and pipe end 48 conically conform to establish the signal chamber encircling the pipe 46 and extending forwardly of the emitter orifice as in FIG. 2. The similar supply pipe 47 is similarly secured within the opening 42 and similarly defines the collector chamber projecting forwardly of the emitter orifice of the pipe 47.

A tap opening 51 is provided in the top of body 40 in FIG. 7 and communicates with the control chamber. Tap opening 51 which can be either a control signal or collector signal tap is shown as an input control signal connection to maintain continuity with FIGS. 2 and 3.

A control signal pipe 52 is secured within the opening and connected to any suitable source of a fluid signal.

An output signal tap opening 53 is similarly provided in the bottom side of the body with an output signal pipe 54 secured therein.

As previously noted, the embodiment of the invention illustrated in FIGS. 6 and 7 can be operated as either an amplifier or a switching device. The input and output sections are identical and can be reversed.

In the illustrated embodiments of the invention, a symmetrical three dimensional open flow system has been illustrated. However, if desired, a closed or semi-closed two or three dimensional flow pattern can also be employed within the broadest scope of the present invention by the provision of suitable confining walls in the construction of the unit of the several chambers. The present invention thus provides a highly improved pure fluid amplifier based on the use of opposed momentum fluxes of two streams. In combination with a high input impedance fluid device, a pure fluid device is provided which closely simulates the operation of electronic modulating devices.

Various modes of carrying out the invention are contemplated as being within the scope of the following claims particularly pointing out and distinctly claiming the subject matter which is regarded as the invention.

We claim:
1. In a fluid control unit,
 (a) means for establishing a pair of impacting fluid jet streams having predetermined operating paths and having opposed stream velocity components and having an impacting position, said means including separate means for establishing each of said jet streams,
 (b) control means to modulate the effective strength of at least one of said jet streams to thereby vary the impacting position, and
 (c) means including an orifice aligned with said impacting position and located to interact therewith, said orifice defining an output chamber to one side of the orifice having an output connection for deriving a signal and a reference chamber to the opposite side, with the impacting position of the streams with respect to the orifice defining the output signal within the output chamber and being related to the control means.

2. The fluid device of claim 1 wherein said impacting streams are vented in said reference chamber to a reference pressure less than the pressure of said streams.

3. The fluid device of claim 1 wherein said streams are of the same general diameter and issued under the same general pressure.

4. The fluid device of claim 1 wherein said impacting streams are substantially aligned and issued under substantially the same pressure.

5. The fluid control unit of claim 1 wherein the control means includes:
 (a) a pure fluid input device having one of said jet streams passing through a control space defined by a supply orifice and a control orifice and having a controllable fluid atmosphere within said space symmetrically impressed upon said jet stream.

6. In a fluid device,
 (a) means for establishing a pair of aligned and opposed impinging fluid jets, said jets being free jets and establishing a momentum flux balance position, said means including separate means for establishing each of said jets,
 (b) orifice means positioned to receive said streams at the momentum flux balance position and establishing a controllable fluid output signal to one side thereof, and
 (c) control means to vary the effective strength of at least one of said jets and thereby vary the momentum flux balance position and the resulting fluid output signal.

7. In a fluid control unit producing a low impedance output pressure signal,
 (a) means to establish a pair of substantially opposed impacting free jet streams of fluid,
 (b) a fluid signal means coupled through a high impedance to said first-named means and providing a fluid signal impressed on at least one of said jet streams for adjusting the strength thereof, and (c) averaging aperture means disposed at the momentum flux balance position and defining a portion of an output means to collect the output of said impacting jet streams, said fluid signal varying the momentum flux balance position and thereby providing an output proportional to the fluid signal.

8. In a fluid control system,
(a) means to establish a pair of oppositely flowing impacting streams of substantially the same strength for establishing a momentum flux balance at the position of impact, and
(b) an output collector having an output orifice operatively disposed with respect to the position of momentum flux balance of said stream, said collector orifice defining a substantial engaging encirclement of the adjacent streams with a reference atmosphere and pressure to one side thereof and an output atmosphere and pressure to the opposite side thereof, said streams being essentially free streams to opposite sides of the collector orifice.

9. The fluid control system of claim 8 wherein said output orifice is related to the size of said impacting streams to average the momentum flux of the respective streams.

10. The fluid control system of claim 8 wherein said output orifice includes an inlet opening no greater than the size of the stream introduced through said reference chamber whereby said stream essentially seals the output chamber and establishes a high impedance to the reference region.

11. The fluid control system of claim 10 wherein said output orifice and said streams are selected to create an interaction between the output orifice and the impacting position of the stream providing an action corresponding to and in effect forming a positive feedback signal within said output chamber and the output constitutes a fluid switch.

12. The fluid control system of claim 10 wherein said output orifice and said streams are selected to create a negative feedback signal within said output chamber and the output constitutes a proportional fluid amplifying means.

13. In a fluid control stream,
(a) an output collector having an output orifice defining an output chamber to one side thereof and a reference chamber to the opposite side thereof,
(b) a first free stream forming means establishing a first free power stream of a selected pressure and entering the output orifice from said reference chamber,
(c) a second free stream forming means establishing a second free power stream of a pressure substantially corresponding to said selected pressure and entering said output orifice from the output chamber and interacting with the first stream to form a momentum balance interacting with the output orifice with an output fluid signal generated in the output chamber, and
(d) control fluid stream means engaging and interacting with said first stream to change the strength thereof and thereby vary the momentum balance of said two streams, small changes in the control fluid stream means producing amplified changes in the output fluid signal.

14. A fluid operated system comprising,
(a) first means for issuing a free fluid stream under pressure,
(b) second means for issuing a second fluid stream under a pressure of the same order as the first named stream and in opposed relation to the first named stream to define a momentum force balance position,
(c) an output chamber having an output orifice arranged to intercept said streams and average the momentum flux of said streams at the momentum force balance position, and
(d) a pure fluid control means establishing a fluid signal impressed upon one of said streams to change the strength thereof at the corresponding input to the output orifice and thereby change the momentum force balance position with respect to the output orifice and the output fluid signal in said output chamber.

15. A fluid operated system comprising,
(a) first means for issuing a fluid stream under pressure,
(b) second means for issuing a second fluid stream under a pressure of the same order and substantially opposed to the first fluid stream to establish impacting streams having a momentum force balance position,
(c) an output chamber having an output orifice arranged to intercept said streams and average the momentum flux of said streams to indicate the position of the momentum force balance with respect to the orifice,
(d) a control chamber having a control orifice disposed in spaced relation to the output orifice and concentrically of one of said main streams, and
(e) means to establish a fluid signal within the control chamber for controlling the strength of said main stream emitted therefrom.

16. The system of claim 15 wherein,
(a) said main streams are formed by a pair of opposed nozzles,
(b) said output chamber includes one of said opposed nozzles terminating therein in spaced alignment with the output orifice, and
(c) said control chamber includes the second of said opposed nozzles terminating therein in spaced alignment with the control orifice.

17. The system of claim 16 wherein,
said output orifice lies within the outer boundary of the stream from said control orifice.

18. The system of claim 16 wherein said control orifice is selected to be at least smaller than the boundary of the related main stream and the signal stream.

19. In a pure fluid amplifier,
(a) a base having a pair of opposed and spaced nozzles with substantially aligned orifices for establishing opposed power streams of substantially similar pressures,
(b) a pair of wall means disposed between said nozzles and sealed one each to the adjacent nozzle to define substantially sealed control chambers, said wall means having aligned orifices aligned with the nozzle orifices,
(c) means to establish a reference pressure less than the stream pressures between said wall means, and
(d) signal passageway means coupled to said control chambers.

20. In a pure fluid amplifier,
(a) a body portion having a recess defining a reference chamber,
(b) control chambers, one to each side of said reference chamber and similar sized control orifices providing communication therebetween,
(c) power stream chambers, one to each side of the said control chambers and having power stream orifices aligned with the control orifices,
(d) signal passageway means coupled to said control chambers,
(e) means coupled to the power stream chambers to establish a pair of oppositely directed fluid streams under pressure, said streams being arranged to produce a momentum flux balance generally within a first of said control orifices, and
(f) a control signal means of a substantially smaller pressure than said power streams connected to the signal passageway means to the control chamber having the second of said control orifices for establishing a fluid control signal impressed upon the power stream from the immediately adjacent power stream orifice.

References Cited by the Examiner

UNITED STATES PATENTS

| 1,381,095 | 6/1921 | Starr. | |
| 3,039,490 | 6/1962 | Carlson | 137—81.5 |
| 3,068,880 | 12/1962 | Riordan | 137—81.5 |
| 3,080,886 | 3/1963 | Severson | 137—81.5 |
| 3,124,999 | 3/1964 | Woodward. | |
| 3,128,040 | 4/1964 | Norwood. | |
| 3,159,168 | 12/1964 | Reader | 137—81.5 |
| 3,186,422 | 6/1965 | Boothe | 137—81.5 |

FOREIGN PATENTS 1,136,518  9/1962  Germany.

M. CARY NELSON, *Primary Examiner.*

S. SCOTT, *Assistant Examiner.*